United States Patent [19]

Sasaki et al.

[11] Patent Number: 4,584,978
[45] Date of Patent: Apr. 29, 1986

[54] METHOD AND APPARATUS FOR CONTROLLING SPARK TIMING IN INTERNAL COMBUSTION ENGINES

[75] Inventors: Kiyotaka Sasaki, Nagoya; Ryosuke Tachi, Kariya; Katsunori Iwamoto, Oobu, all of Japan

[73] Assignee: Nippondenso Co., Ltd., Kariya, Japan

[21] Appl. No.: 671,616

[22] Filed: Nov. 15, 1984

[30] Foreign Application Priority Data

Nov. 15, 1983 [JP] Japan ................................. 58-214286

[51] Int. Cl.$^4$ .............................................. F02D 43/00
[52] U.S. Cl. ..................................... 123/417; 123/414; 123/416; 123/486; 123/618
[58] Field of Search ............... 123/414, 416, 417, 418, 123/486, 618

[56] References Cited

U.S. PATENT DOCUMENTS

| 4,086,895 | 5/1978 | Habert | 123/414 |
| 4,380,982 | 4/1983 | Kobashi | 123/414 |
| 4,414,946 | 11/1983 | Däumer et al. | 123/414 |
| 4,432,322 | 2/1984 | Inoue et al. | 123/414 |
| 4,467,764 | 8/1984 | Takasa et al. | 123/416 |
| 4,480,615 | 11/1984 | Takasa et al. | 123/416 |
| 4,485,784 | 12/1984 | Fujii et al. | 123/414 |
| 4,498,438 | 2/1985 | Sato | 123/416 |
| 4,499,875 | 2/1985 | Katayama et al. | 123/416 |
| 4,502,441 | 3/1985 | Katayama et al. | 123/414 |

Primary Examiner—Raymond A. Nelli
Attorney, Agent, or Firm—Cushman, Darby & Cushman

[57] ABSTRACT

An apparatus for controlling the spark timing of an internal combustion engine comprises means for generating a reference position signal with reference to a predetermined engine crankshaft position; waveform shaping means for generating a reference pulse signal having a leading edge advanced with respect to the predetermined crankshaft position as a function of the engine speed, in accordance with the reference position signal; means for detecting the amount of engine load; means for detecting the rotational speed of engine; means for computing a period of time elapsed from the leading edge of the reference pulse in accordance with the detected engine load and engine speed in order to establish a spark timing; means for detecting the variation of period between the leading edge and trailing edge of the reference pulse in relation to each cylinder; and means for correcting the computed period of time in accordance with the detected variation and for generating an output signal causing ignition to occur after the elapse of corrected period of time. The computer estimate spark timing for each cylinder is corrected in accordance with the variation of a period between the leading edge and the trailing edge of the reference pulse, resulting in an optimum spark timing without variation among individual cylinders.

5 Claims, 9 Drawing Figures

METHOD AND APPARATUS FOR CONTROLLING SPARK TIMING IN INTERNAL COMBUSTION ENGINES

BACKGROUND OF THE INVENTION

This invention relates generally to ignition or spark timing control systems for use in internal combustion engines, and more particularly to a method and apparatus for controlling spark timing for each cylinder of engine so that the ignition is effected with high precision.

Various types of electronic ignition timing control system have been developed with a view to maximizing the thermal efficiency of internal combustion engines to meet increasing demands for energy savings.

Conventional ignition timing control systems are arranged such that the ignition is performed after the elapse of a predetermined time in response to a reference position signal which is obtained in response to the piston position in each engine cylinder reaching top dead center (TDC). The reference position is established at a position advanced from the TDC.

In the conventional systems, there is a problem associated with the imprecision of spark timing in a transition period, particularly, in the case that the spark timing is established at time elapsed much from the reference position.

According to another prior art approach, as is described in Japanese Laid-open Application No. 57-195867, there is a control system of spark timing comprising: means for generating a reference pulse having a leading edge advanced as a function of the rotational speed of engine; and control means for computing, using the engine load and engine speed, a spark timing as a period of time elapsed from the leading edge of the reference pulse and for effecting the ignition in accordance with the computation.

On the plus side, the prior art system of second type is being appraised successfully with regards to the prevention of the decrease of engine output when the engine is accelerated and to the prevention of the aggravation of acceleration feeling. On the other hand, as a problem associated with the second prior art, the position of leading edge of reference pulse signal is varied because of the difference in performance of sensor for detecting the reference position such as a predetermined engine crankshaft position, cyclic variaion of each cylinder, eccentricity of drive system, and the like, resulting in a poor spark timing precision. For a better understanding of the problem associated with the prior art, are illustrated FIGS. 1A and 1B showing reference pulses generated by a waveform shaping circuit and pulse signals causing the ignition to occur. It is seen from FIG. 1A that the position of leading edge of pulse is varied, and therefore the pulse duration are also varied with cycle because the position of trailing edge of the reference pulse is stabilized. As a result, the spark timing is similarly varied as shown in FIG. 1B. The reason is that the spark timing is determined in accordance with the pulse duration. In FIG. 1B, the numerals represent cylinders to be ignited in response to the pulse signal.

SUMMARY OF THE INVENTION

It is, therefore, an object of the present invention to provide a new and simplified method and apparatus with which spark timing of each cylinder is accurately controlled such that problems associated with the prior art, such as the variation of spark timing among cylinders and the like, are eliminated.

According to a feature of the present invention, the correction of a period of time elapsed from the leading edge of reference pulse is effected for each cylinder in accordance with a period between the leading edge and the trailing edge of the reference pulse, and the ignition for each cylinder is performed after the elapse of the corrected period of time. The reference pulse is generated in response to a reference position, such as a predetermined crankshaft position. The reference pulse has a leading edge which is advanced with respect to the predetermined crankshaft position or top dead center (TDC) as a function of engine speed. The period of time is derived from the engine load and the engine speed.

An apparatus for controlling spark timing according to the present invention comprises: means for cyclically generating a reference position signal with reference to a predetermined engine crankshaft position; waveform shaping means for generating a reference pulse signal having a leading edge which is advanced with respect to the predetermined engine crankshaft position as a function of the engine speed, in accordance with the reference position signal; means for detecting the amount of engine load; means for detecting the rotational speed of engine; means for computing a period of time elapsed from the leading edge of the reference pulse in accordance with the detected engine load and engine speed in order to establish a spark timing; means for detecting the variation of period between the leading edge and trailing edge of the reference pulse in relation to each cylinder; and means for correcting the computed period of time in accordance with the detected variation and for generating an output signal causing ignition to occur after the elapse of corrected period of time.

With this construction and arrangement according to the present invention, it is now possible to prevent the variation or difference of spark timing among individual cylinders and the retardation of spark timing on engine acceleration, resulting in an optimum spark timing for each cylinder. In addition to this advantage, a spark timing control system according to the present invention comparatively allows a simplified design and has a reliability.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE INVENTION

Figure 2:
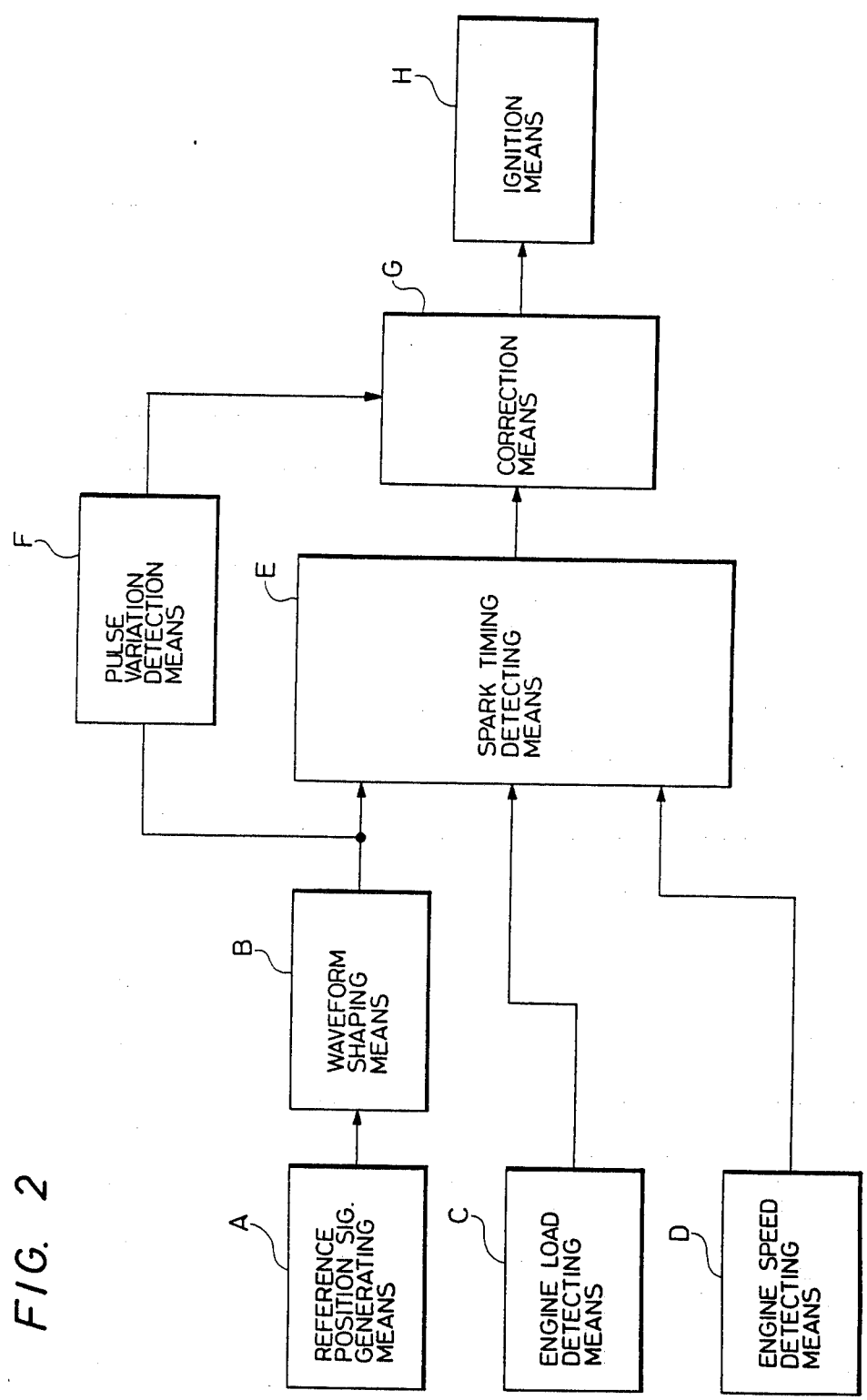
FIG. 2 is a schematic block diagram of a spark timing control system according to the present invention.
Figure 3:
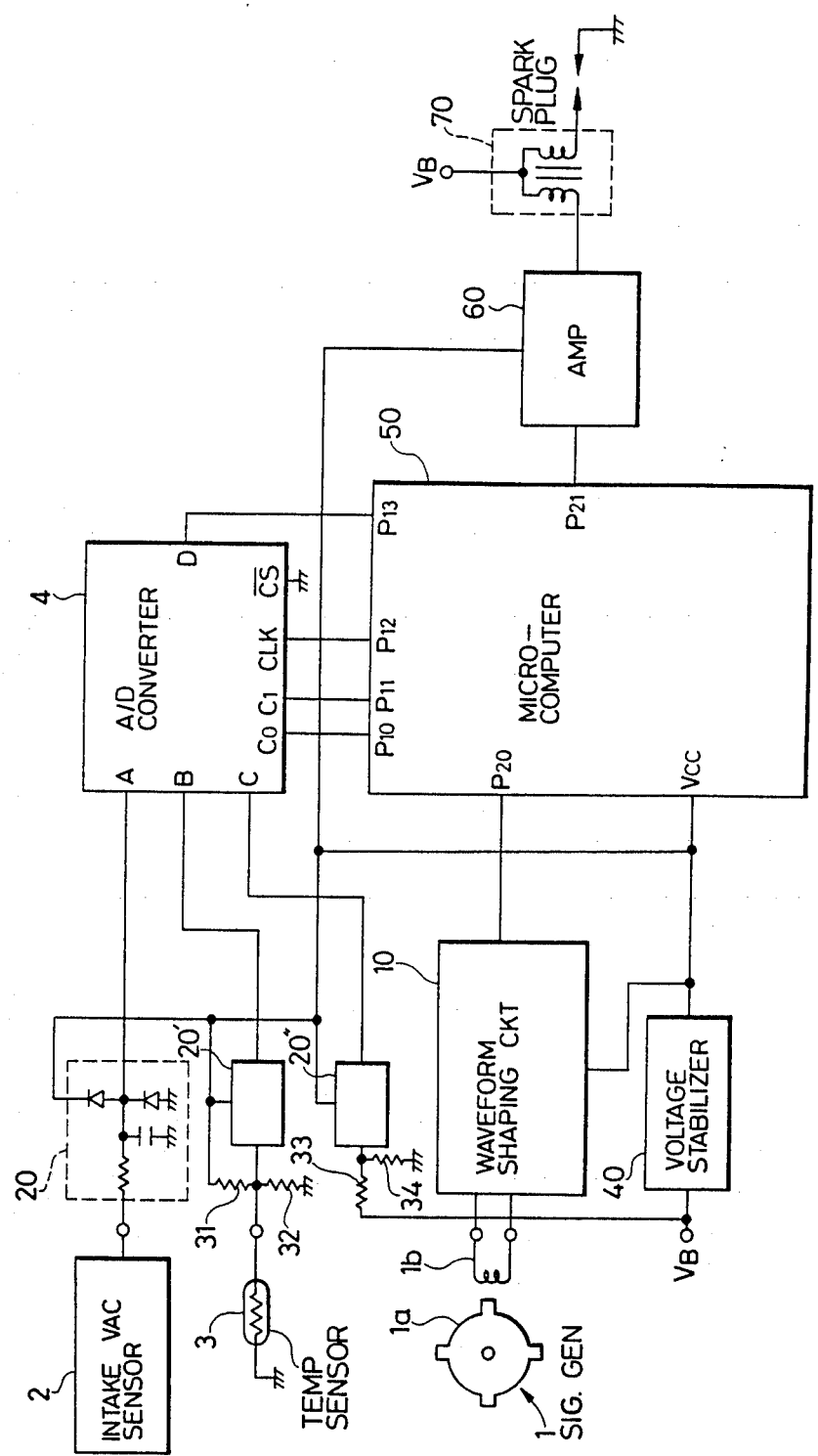
FIG. 3 is a block diagram of the spark timing control system according to an embodiment of the present invention.

Prior to describing the preferred embodiment of the present invention with reference to FIG. 3, the general arrangement and construction of spark timing control system according to the present invention will first be described for a better understanding, referring to FIG. 2.

A system for spark timing control according to the present invention comprises reference position signal generating means A, waveform shaping means B, engine load detecting means C, engine speed detecting means D, spark timing computing means E, pulse variation detecting means F, and correction means G. A reference position signal, which is generated by the signal generating means A in response to a predetermined engine crankshaft position, is fed to the waveform shaping means B in order to produce a reference pulse signal having a leading edge which is advanced with respect to the predetermined engine crankshaft position as a function of the engine speed. The reference pulse signal from the wave shaping means B is supplied to the computing means E and the pulse variation detecting means F. The computing means is coupled to the engine load detecting means C and the engine speed detecting means D for receiving each detected signal representing the amount of engine load and engine speed, a spark timing being computed as a period of time elapsed from the leading edge of the reference pulse in accordance with the detected signals. A signal corresponding to the computed period of time is fed to the correction means G for correcting the computed period of time in accordance with an output of the pulse variation detecting means F. The correction means G supplies an ignition signal to ignition means H after the elapse of period of time corrected.

A preferred embodiment of the present invention will now be described with reference to FIG. 3.

Illustrated at the reference 1 is a reference position signal generator for generating a reference position signal indicative of a predetermined engine crankshaft position, which comprises a toothed ferromagnetic wheel 1a having four teeth each corresponding to each cylinder of a four-cycle internal combustion engine (taking an example of a four-cylinder and four-cycle engine for simplicity) and an electromagnetic transducer 1b stationarily mounted with respect to and in proximity with the circumference of the toothed wheel 1a. The tooth wheel 1a is encased in a distributor and is coupled to a distributor shaft such that it rotates with engine crankshaft. With the rotation of toothed wheel 1a, the electromagnetic transducer 1b cyclically generates a reference position signal, as shown at a in FIG. 4, in response to the position of each cylinder, for example TDC.

Figure 4:
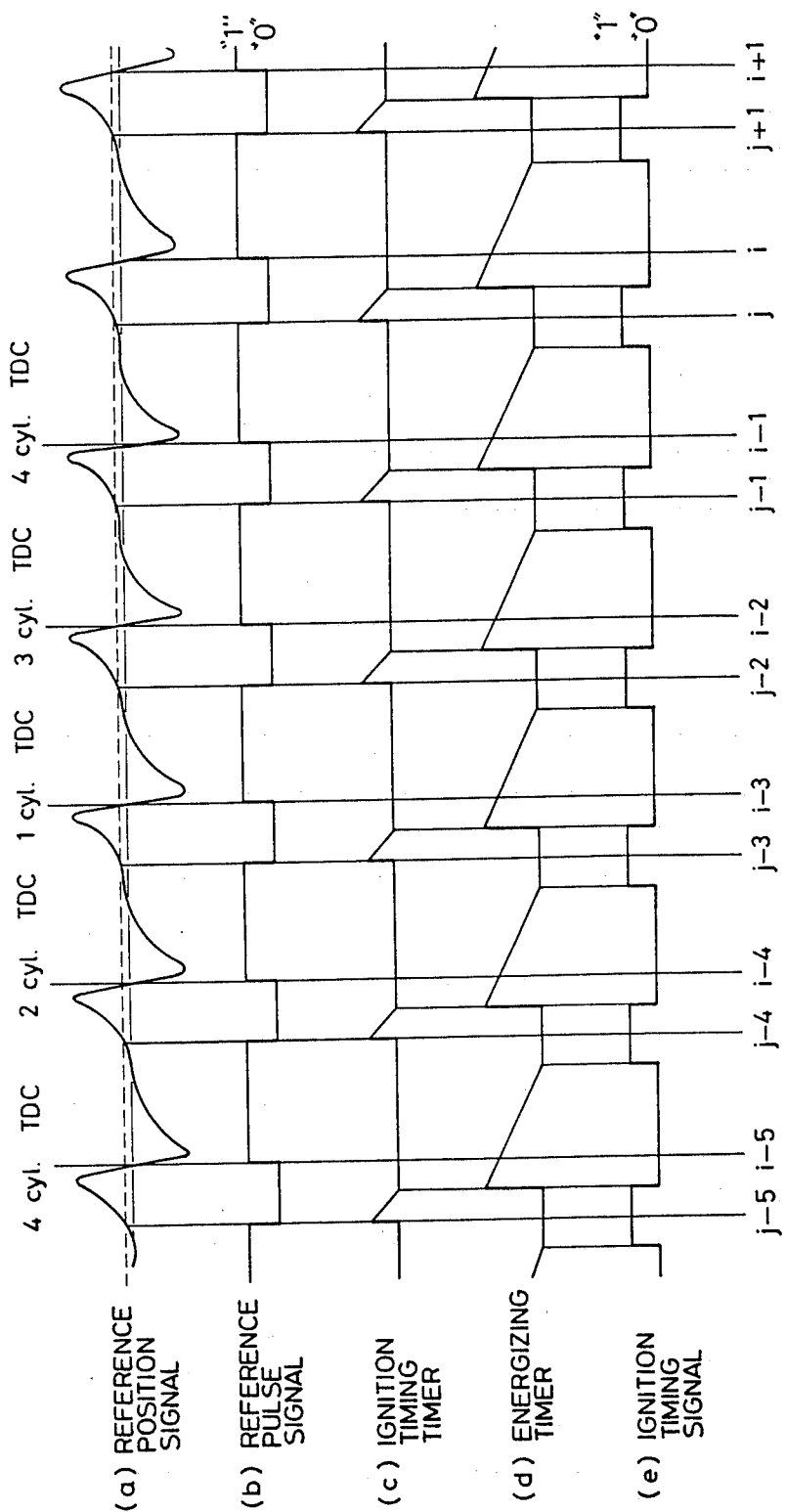
FIG. 4 is a timing giagram useful for describing the operation of the spark timing control system according to the present invention.
Figure 5:
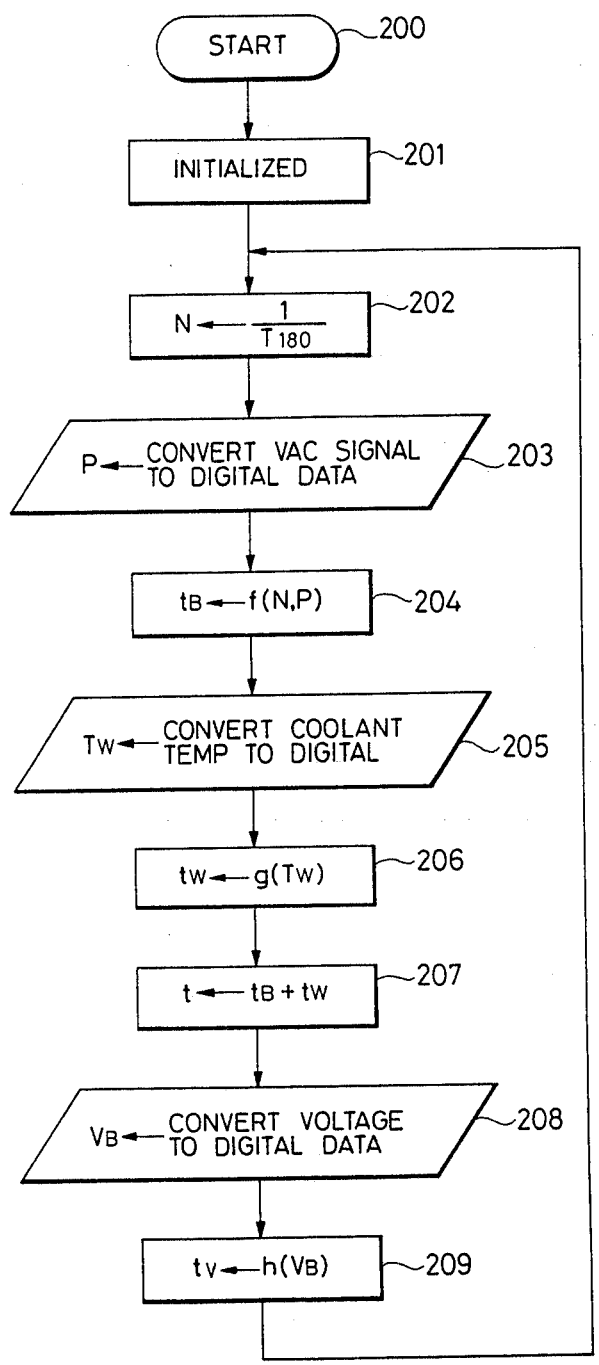
FIGS. 5, 6 and 7 are flow charts of the program provided for a microcomputer of FIG. 3.

Designated at numeral 10 is a waveform shaping circuit which shapes the waveform of the reference position signal into a pulse signal as shown at b in FIG. 4. The engine load is detected by an intake vacuum sensor 2 and a signal corresponding to the engine load is fed to an input terminal A of an A/D converter 4 through a CR filter 20 for eliminating noise. The engine coolant temperature is detected by a engine coolant temperature sensor 3 and a signal indicative of the engine coolant temperature is supplied to an input terminal B of the A/D converter 4 via a CR filter 20' in which a bias voltage is applied by means of resistors 31, 32. A battery voltage $V_B$ is applied to an input terminal C of the A/D converter 4 via a CR filter 20'' after divided by resistors 33, 34. Numeral 40 designates a voltage stabilizer, which is energized by the battery voltage $V_B$, for providing 5 volt-stabilized voltage.

The A/D converter 4 is a well known converter of successive apporximation type with an analog multiplexer and converts analog voltage into 8-bit data which is fed to a microcomputer 50 having a central processing unit (CPU), memories (ROM, RAM), input-/output device (I/O), and so on. The microcomputer 50 is energized with the stabilized voltage to be applied at Vcc terminal thereof. An output signal of the waveform shaping circuit 10 is fed to a port $P_{20}$ of the microcomputer 50. Numeral 60 represents a current amplifier for amplifying an output of the microcomputer 50 to be supplied from a port $P_{21}$. The amplified output is applied to an ignition coil 70.

The operation of the microcomputer 50 will now be described with reference to FIGS. 4, 5, 6 and 7.

Figure 6:
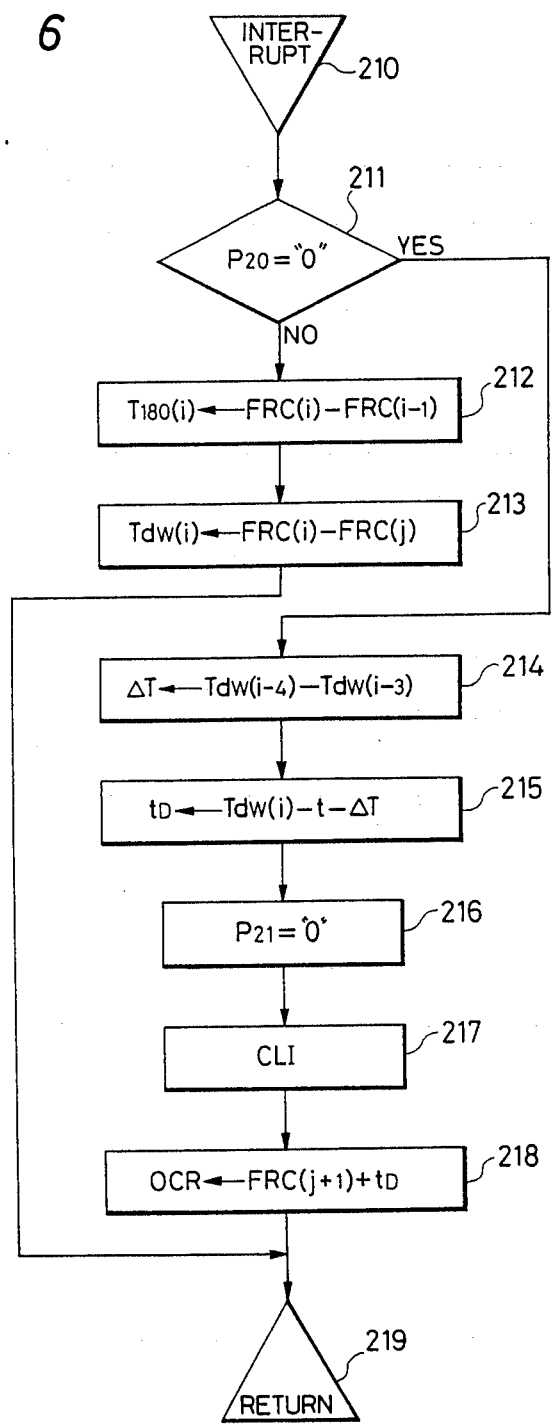

When an ignition switch is turned on, the battery voltage $V_B$ is applied to the spark timing control system and then the stabilized voltage generated by the voltage stabilizer 40 is applied to the microcomputer 50 and its associated circuitry. The microcomputer 50 is energized, and initialization in the microcomputer 50 is performed to start program execution from a step 200 in a main routine of FIG. 5. In a step 201, input/output ports $P_{10}$, $P_{11}$, $P_{12}$, $P_{13}$, $P_{20}$, and $P_{21}$ are set and the memory variables are initialized. An interrupt request is applied to the microcomputer 50 so that the operational flow enters into a first interrupt service routine named an input capture interrupt routine as shown in FIG. 6, which will be described hereinlater. In a following step 202, the engine speed data N is obtained by performing a reciprocal operation of the interval $T_{180}$ which represents the period for 180 crankangle, i.e., a period for one cycle of the reference position signal shown at a in FIG. 4. In a step 203, the binary conditions of the ports $P_{10}$ and $P_{11}$ are set to logical level "0", respectively, to select an intake vacuum signal, and then microcomputer provides 8 clocks to the port $P_{12}$ so that the intake vacuum signal converted into digital signal by the A/D converter 4 is inputted from the port $P_{13}$. In a step 204, a map operation is performed to obtain a basic advanced time data $t_B$ corresponding to a period elapsed from the ignition timing to TDC, as a function of engine speed data N and intake vacuum data P. In steps 205 and 206, the engine coolant temperature $T_W$ is converted to a corresponding digital value and coolant compensation period data $t_W$ is derived from a look-up table, $g(T_W)$. In a step 207, an advance angle data t with respect to TDC is obtained from the sum of basic advanced time data $t_B$ and coolant compensation period data $t_W$. In the next steps 208 and 209, the battery voltage $V_B$ is converted to a corresponding digital value and a period data $t_V$ is derived from a look-up table, $h(V_B)$, as a function of battery voltage data $V_B$ for the purpose of compensating for the energizing duration of a ignition coil. The operational flow returns to the step 202.

The input capture interrupt routine will be described with reference to FIG. 6.

Figure 1A:
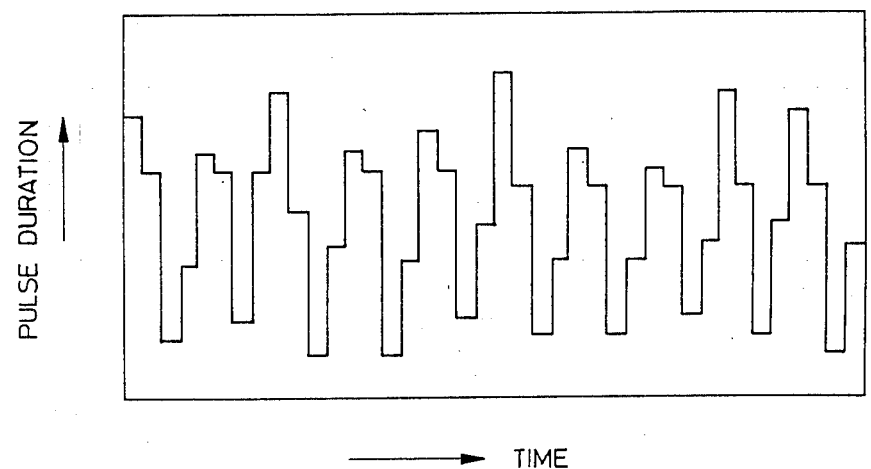
FIG. 1A is an illustration of reference pulses generated from a waveform shaping circuit.
Figure 1B:
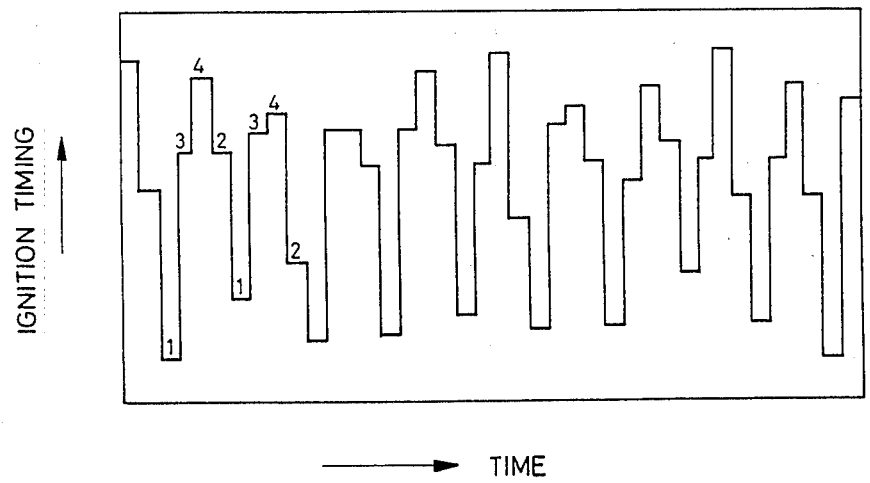
FIG. 1B is an illustration of pulse signals causing the ignition to occur, which is produced according to the prior art.
Figure 7:
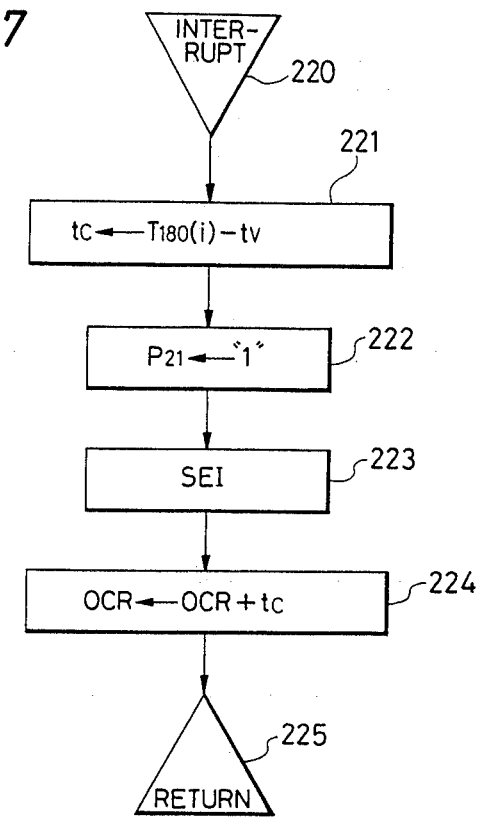

In a step 210, the interrupt is performed in response to a leading edge and a trailing edge of the output signal of waveform shaping circuit 10 shown at b in FIG. 4, i.e., timing i on trailing edge (rising edge) and timing j on leading edge (falling edge). In a following step 211, it is checked whether the timing is one of i, i-1, i-2 . . . or one of j, j-1, j-2 . . . . When the timing is one of i, i-1, i-2 . . ., the next step 212 is executed, and when the timing is one of j, j-1, j-2 . . . , the operation flow goes to a step 214. In the step 212, the interval $T_{180}$ is computed by taking the difference between the value of free running counter (FRC) at time i in which the interrupt has been effected and the value of the counter (FRC) at time i-1 in which the interrupt has been effected previously. A period of one cycle of the reference position signal is obtained. In a step 213, a interval $Td_W$ is computed by taking the difference between the the values of free running counter (FRC) at time i and at time j. A period of logical "0" level is obtained. On the other hand, in a step 214, the difference interval T is calculated by taking the difference between an interval $Td_W(i-4)$ at time i-4 and a interval $Td_W(i-3)$ at time i-3. The difference between logcal "0" level periods of the first and second cylinders is obtained. The period of logical "0" level is varied among individual cylinders, as shown in FIG. 1A. In a following step 215, a time $t_D$ elapsed from reference position signal, which represents ignition timing with respect to TDC, is obtained by taking away the difference interval T in the step 214 and advance angle t in the step 207 of main routine from interval $Td_W$ in the step 213. The spark timing of first cylinder can not be operated, at time j-1, by using the formula $t_D = Td_w(i+1) - t$, and therefore, instead of $Td_w(i+1)$, the interval $Td_w$ in the step 213 is used, and is corrected using the difference interval T in the step 214. A step 216 is executed for the purpose of placing a logical "0" level at port $P_{21}$. In a step 217, the execution of a second interrupt service routine named output compare interrupt, which will be described hereinlater, is allowed. In a step 218, the sum of the elapsed time $t_D$ in the step 215 and the value of free running counter (FRC) at time j+1 is stored in an output compare register (OCR), whereby an ignition timing timer is set as shown at c in FIG. 4. When the value of the free running counter corresponds to the vale of the output compare register, i.e., when counted down to zero, the microcomputer place logical "0" level to port $P_{21}$ as shown at e in FIG. 4. At the same time, the operational flow enters into an output compare routine as shown in FIG. 7.

The output compare interrupt routine will now described with reference to FIG. 7.

The output compare interrupt starts from a step 220 in response to leading edge (rising edge) of ignition timing signal. In a following step 221, a cutoff interval $t_c$ for establishing the energizing duration of an ignition coil is computed by taking the difference between one cycle of reference signal $T_{180}$ (i) and the period data $t_V$ for energizing in the step 209 of main routine. In a step 222, the preparation for placing logical "1" level to port $P_{21}$ is effected. In a step 223, the output compare interrupt is inhibited. In a step 224, the sum of the breaking interval $t_c$ in the step 221 and the value of output compare register OCR at time that the interrupt has been effected in the step 220 is stored into the output compare register OCR, whereby an energizing timer is set as shown at d in FIG. 4. When the value of OCR corresponds to the value of free running counter, i.e., when counted down to zero, the microcomputer places logical "1" level to the port $P_{21}$. The above-mentioned routine repeatedly executed. As a result, the ignition timing signal shown at e in FIG. 4 is fed to the amplifier 60 for energizing the ignition coil 70.

Figure 8:
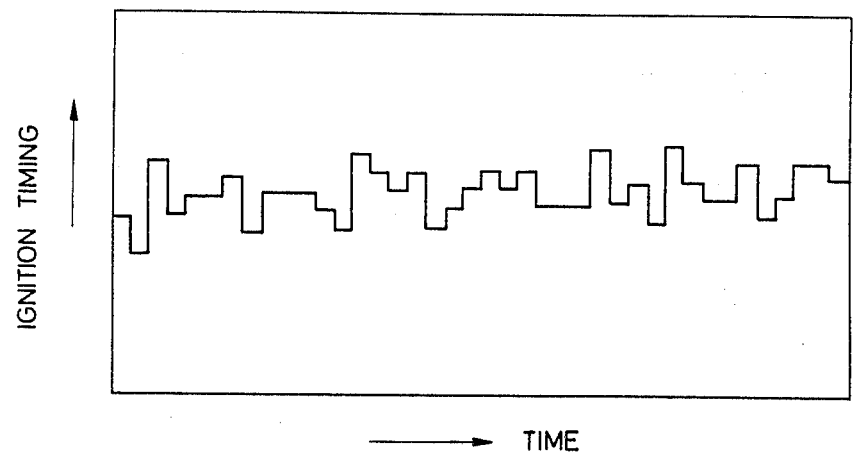
FIG. 8 is an illustration of pulse signals causing the ignition to occur, which is produced according to the present invention.

FIG. 8 is an illustration of pulse signals causing the ignition to occur, which is produced according to the present invention. It is seen from FIG. 8 that the ignition timing without the variation among individual cylinders is obtained as compared with that of FIG. 1A.

What is claimed is:

1. Apparatus for controlling the spark timing of an internal combustion engine having a crankshaft, comprising:
    (a) sensor means for sensing engine operating parameters including engine load and engine rotational speed;
    (b) means for generating a reference position signal indicating a predetermined engine crankshaft position;
    (c) means responsive to said reference position signal generating means for generating a reference pulse signal having a leading edge advanced with respect to the predetermined engine crankshaft position as a function of the rotational speed of said engine crankshaft and having a trailing edge substantially coinciding with the predetermined engine crankshaft position;
    (d) means for deriving a desired ignition timing as a function of the engine operating parameters sensed by said sensor means;
    (e) means for computing a period of time elapsed from the leading edge of said reference pulse so that the end of said period of time coincides with said desired ignition timing;
    (f) means for detecting the variation of a period between the leading edge and the trailing edge of said reference pulse in relation to each cylinder of said engine; and
    (g) correction means including means responsive to said computing means and detecting means for correcting the computed period of time in accordance with the detected variation and means for generating a signal causing an ignition to occur after the elapse of the corrected period of time in response to the leading edge of said reference pulse.

2. Apparatus as claimed in claim 1, wherein said reference position signal generating means comprises:
    (a) a toothed wheel rotating with said crankshaft; and
    (b) an electromagnetic pickup coil fixedly mounted in proximity with the circumference of said toothed wheel for generating a signal indicative of said predetermined engine crankshaft position.

3. Apparatus as claimed in claim 1, wherein said reference pulse signal generating means comprises a waveform shaping circuit.

4. Apparatus for controlling the spark timing of an internal combustion engine having a crankshaft, comprising:
    (a) sensor means for sensing engine operating parameters including engine load and engine rotational speed;
    (b) means for generating a reference position signal indicating a predetermined engine crankshaft position;
    (c) means responsive to said reference position signal generating means for generating a reference pulse signal having a leading edge advanced with respect to the predetermined engine crankshaft position as a function of the rotational speed of said engine crankshaft and having a trailing edge substantially coinciding with the predetermined engine crankshaft position; and (d) control means for:

derving a desired ignition timing as a function of the engine operating parameters sensed by said sensor means;

computing a period of time elapsed from the leading edge of said reference pulse so that the end of said period of time coincides with said desired ignition timing;

detecting the variation of a period between the leading edge and the trailing edge of said reference pulse in relation to each cylinder of said engine;

correcting the computed period of time in accordance with the detected variation; and generating a signal causing an ignition to occur after the elapse of the corrected period of time in response to the leading edge of said reference pulse.

5. A method for controlling the spark timing of an internal combustion engine of a motor vehicle having a crankshaft, comprising the steps of:

(a) sensing engine operating parameters including engine load and engine rotational speed by means of engine operating condition sensors attached to said engine or said vehicle;

(b) generating a reference position signal indicating a predetermined engine crankshaft position;

(c) shaping the waveform of said reference position signal so as to produce a reference pulse signal having a leading edge advanced with respect to the predetermined crankshaft position as a function of the rotational speed of said engine crankshaft and having a trailing edge substantially coinciding with the predetermined engine crankshaft position;

(d) deriving a desired ignition timing as a function of the sensed engine operating parameters;

(e) computing a period of time elapsed from the leading edge of said reference pulse so that the end of said period of time coincides with the derived desired ignition timing;

(f) detecting the variation of a period between the leading edge and the trailing edge of said reference pulse in relation to each cylinder of said engine;

(g) correcting the computed period of time in accordance with the detected variation; and (h) generating a signal causing an ignition to occur after the elapse of the corrected period of time in response to the leading edge of said reference pulse.

* * * * *